Aug. 11, 1964 E. P. G. WRIGHT 3,144,634

TELEGRAPH SYSTEMS

Filed Nov. 20, 1961 3 Sheets-Sheet 1

Inventor
ESMOND P. G. WRIGHT

By [signature]
Attorney

Inventor
ESMOND P. G. WRIGHT
By [signature]
Attorney

Inventor
ESMOND P. G. WRIGHT
By [signature]
Attorney

United States Patent Office 3,144,634

Patented Aug. 11, 1964

3,144,634
TELEGRAPH SYSTEMS

Esmond Philip Goodwin Wright, London, England, assignor to International Standard Electric Corporation, New York, N.Y., a corporation of Delaware Filed Nov. 20, 1961, Ser. No. 153,479
Claims priority, application Great Britain Dec. 15, 1960
2 Claims. (Cl. 340—146.1)

This invention relates to electric telegraph systems using two signalling conditions, called in the case of telegraphy, "mark" and "space" respectively.

Telegraph systems are known in which the information is transmitted in particular code combinations such that errors in the received information can be detected and, in certain cases, corrected. The primary requirement for a telegraph system, however, is the detection of errors. Provided the errors are detected, then it is a matter of expediency as to whether they are corrected by the use of a self-correcting code, or whether the information in question is re-transmitted until a correct transmission is completed.

Several forms of error detecting codes have been proposed, and various ways of checking simple groups of telegraphic characters are known. However, many error detecting codes are unsuitable as a large proportion of the possible combinations in those codes are unusuable or redundant. They also require the information to be transmitted in small groups or individual characters, the latter being made up of a given number of bits of information, and a pause is required between successive characters for the purpose of performing any error detecting and checking processes.

It has been proposed to apply error detecting processes to large groups of telegraphic characters, thus reducing the time taken to transmit a message by reducing the number of pauses or intervals between groups. However, in order to maintain a high rate of detection of errors in such large groups, it is very often necessary to increase the number of checking processes applied to each group. Furthermore, if the same type of check is applied more than once to each group, it is possible for an error to escape undetected, especially in the case of compensating errors. A typical method of checking large groups of telegraph characters is to count the numbers of one of the two signalling conditions in the block of information and to transmit an extra bit of information at the end of the group, this extra bit being indicative of the number counted. Such an extra bit of information is referred to in the rest of this specification as a parity bit. As the size of the block of information is increased, so the effectiveness of a single parity bit is reduced.

If now several parity bits are used the chance of undetected errors is reduced. Also the effectiveness of multiple parity bits is further increased if they are associated with interlaced groups of telegraphic elements which are known as parity words.

Parity bits are derived from a parity word according to a predetermined mathematical formula which is applied to the parity word at the transmitter. The same mathematical formula is applied to the parity word at the receiver, and the two parity bits compared to detect any errors in the parity word.

In determining the formula by which a parity bit is derived, the block of information is usually set out on paper in columns and rows, and the parity bits are then derived from the various co-ordinates of such a block. Two obvious co-ordinates are cases where the parity words are formed by the rows and columns of such a block.

According to one feature of this invention a telegraph signal transmission system using two signalling conditions only (mark and space) comprises a transmitting station, a receiving station, means at the transmitting station for deriving from a block of signal elements a plurality of check elements such that said check elements are indicative of the relation between the marks and spaces contained in said block of signal elements, said check elements being derived individually from selected groups of the signal elements contained in the block, each check element being derived from a different group of the signal elements and each check element being derived by a different mathematical law to those used for deriving the other check elements, means for transmitting the said block of signal elements and the said check elements, and means at the receiving station for deriving from the said block of signal elements a second set of check elements according to the same mathematical laws as used in the transmitting station, and means for automatically comparing the said second check elements with the transmitted check elements, and means for indicating any errors in the transmitted signal elements, said errors being detected by any discrepancies between the two sets of check elements.

In order that the invention may be more clearly understood, a preferred form thereof is now described with reference to the drawings, accompanying the provisional specification, in which—

Since the binary system is used in applying the parity laws to the block of information and such a system is denoted by "1's" and "0's," the terms "mark" and "space" are hereinafter referred to as though they were binary units, i.e. a mark is termed a "1" and a space is termed a "0."

Figure 2:
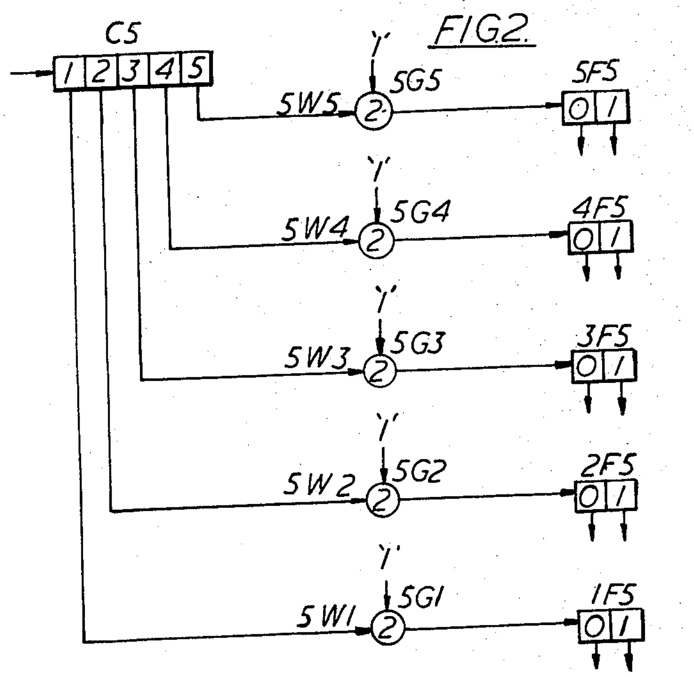
FIG. 2 is a block diagram of a simple circuit used to derive such parity bits.
Figure 4:
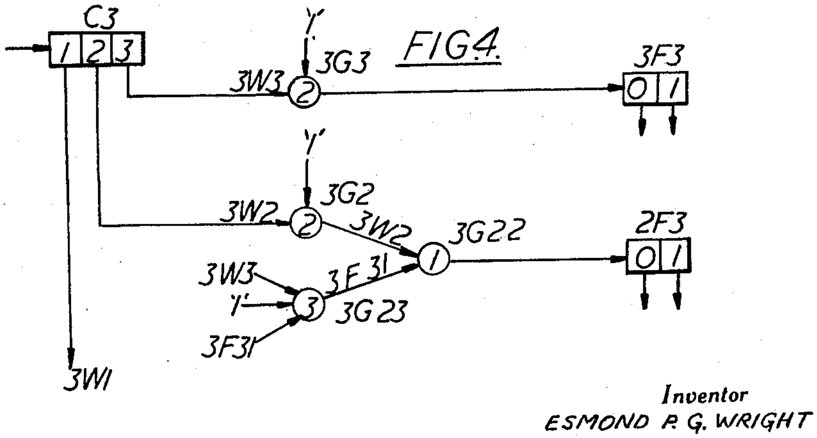
FIG. 4 is a block diagram of part of a simple circuit used to derive such parity bits according to the second parity law.
Figure 6:
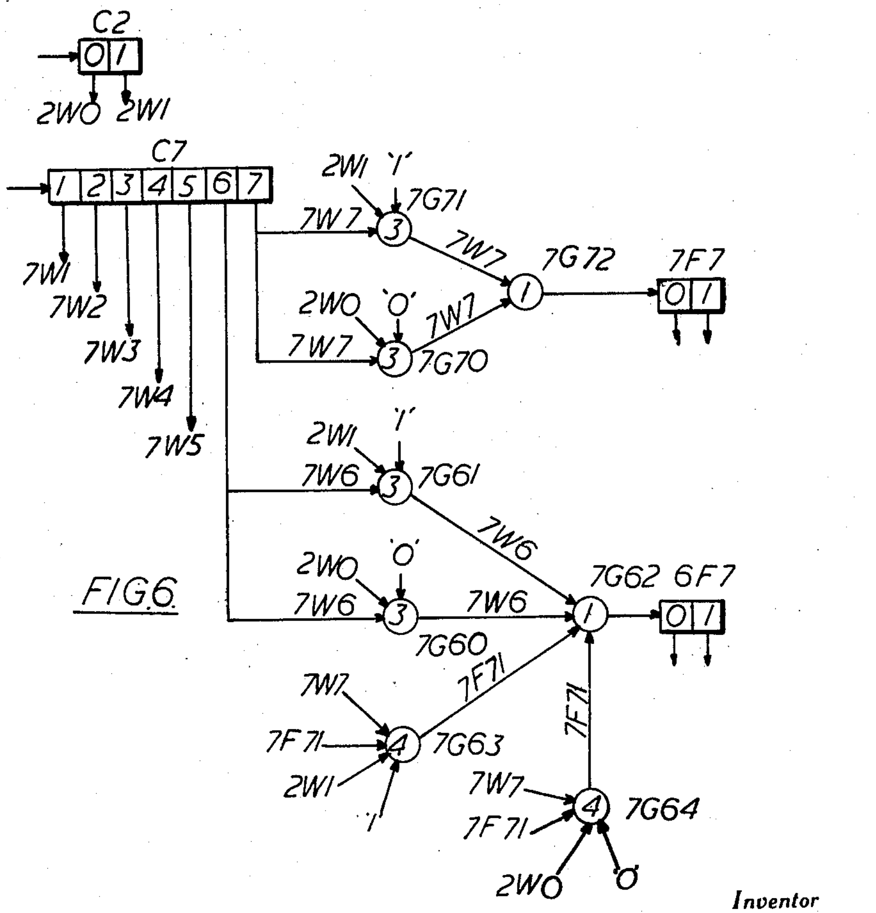
FIG. 6 is a block diagram of part of a simple circuit used to derive such parity bits according to the third parity law.

In FIGS. 2, 4 and 6 of the drawings, various counting and gating devices are represented and referred to. In these drawings there are shown counting or distributing devices which are referred to by the letter C followed by the number of steps which such a circuit operates, for example in FIG. 2 there is shown a distributing circuit C5 which has five steps. The various gating devices in the drawings are referred to by the letter G together with a reference number, and in the symbol for each gating device appears a figure indicative of the number of inputs to the device required to operate simultaneously to produce an output from that device. Such gating devices are of the type disclosed in the specification of British Patent No. 636,700.

Figure 7:
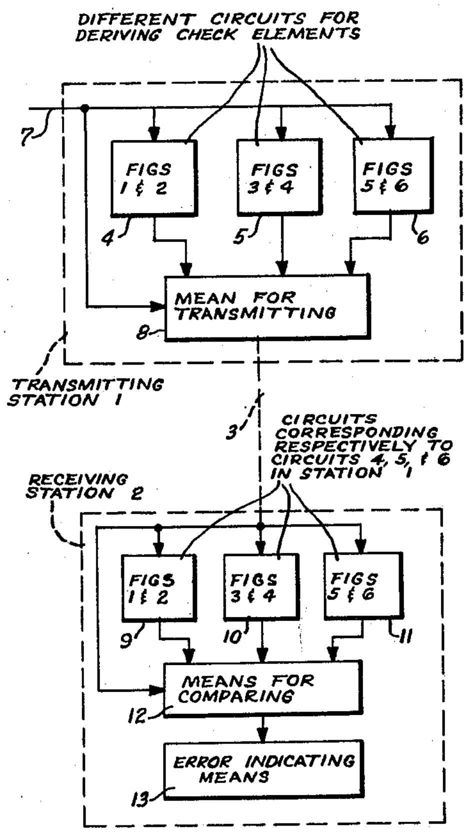
FIGURE 7 is a functional block diagram of a complete system in accordance with the present invention.

As shown in FIGURE 7 a system constructed according to the present invention comprises a transmitting station 1, a receiving station 2, and a transmission line or channel 3 connected therebetween. The transmitting station 1 includes means 4–6 for deriving, from a block of binary signal elements carried, for example, on the line 7, a plurality of groups of check elements; in particular, 3 groups of check elements as indicated by the presence of three circuits 4–6, in the figure. Each group of check elements, derived by any of the circuits 4–6, is indicative of a different parity relation between all of the signal elements of an incoming block; i.e. between all of the marks and spaces in said block. The transmitting station further includes means 8 for transmitting each block of signal elements along with the corresponding groups of derived check elements, via the transmission line or channel 3. The receiving station 2 includes circuit means 9–11, individually corresponding to the circuit means 4–6 at the transmitting station, for deriving second groups of check elements corresponding to the groups of transmitted check elements. The outputs of the circuits 9–11 are fed, together with the transmitted check elements, to means 12 for automatically comparing corresponding transmitted and second check elements. Upon occurrence of a disagreement means 12 is effective to actuate means 13 for indicating such occurrence.

Figure 1:
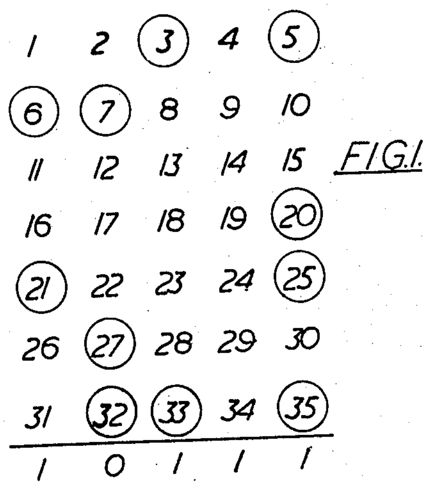
FIG. 1 represents a block of information and the parity bits derived according to one parity law.

Referring to FIG. 1 there is shown a block of signal elements being 35 in number which are normally transmitted as part of a continuous stream of information at a predetermined rate, i.e. such information is transmitted at a fixed rate of *n* bits of information per second. In order to determine a parity law the 35 bits of information have been subdivided into seven groups of five bits each as shown in FIG. 1, this sub-division being one which is commonly adopted as a basis for determining such parity laws.

Figure 3:
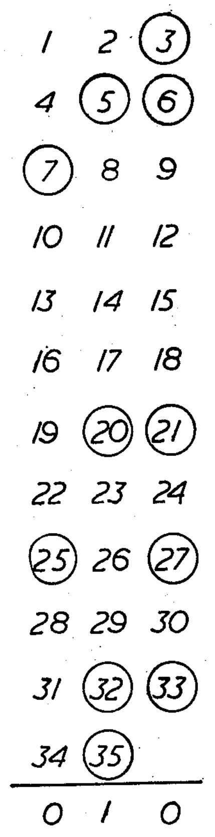
FIG. 3 represents the same block of information rearranged so that a second set of parity bits can be derived according to a second parity law.
Figure 5:
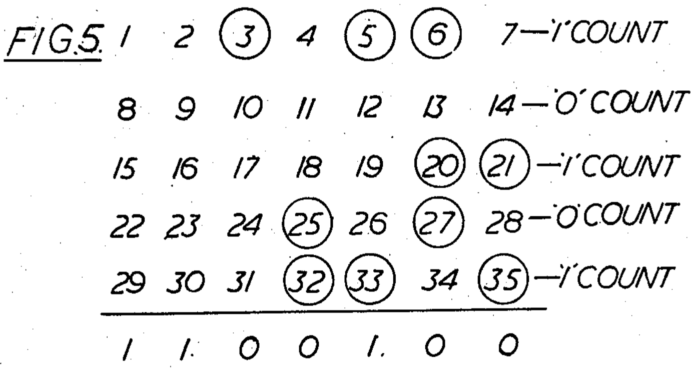
FIG. 5 represents the same block of information rearranged so that a third set of parity bits can be derived according to a third parity law.

A simple parity law derived for the block of information in FIG. 1 is known as an odd parity law without carry. That is, all the "1's" in each column are added, and the total is expressed by the least significant digit of the binary number representing this total. In practice this digit, or parity bit, is often inverted for transmission purposes, but this arrangement whilst shown in FIGS. 1, 3 and 5 is not included in the relevant block circuit diagrams.

In the example shown in FIG. 1 an odd parity law, without carry, is applied to a block of thiry-five bits of information and the parity are shown as having been inverted. The encircled numbers in the block of information are assumed to represent "1's," the remainder "0's." Column 5 has four "1's," binary representation 100, least significant digit of which is 0. This digit is inverted and expressed as 1. The other columns are added up in like fashion and the resultant parity bits for the whole block are seen to be 10111.

The circuit shown in FIG. 2 which determines such parity bits operates as follows.

The counter C5 steps at the same rate as that at which the bits of information are transmitted, and produces a pulse waveform on each step. On the first step of the counter C5 the pulse 5W1 is applied to the two-condition gate 5G1, the other input of which is connected to the transmission line. If a "1" appears on this line then gate 5G1 conducts, and the flip-flop indicator 1F5 will move from 0 to 1, thus counting the "1" in the transmission line. If an "0" appears on the line 1F5 will not operate and thus it will only count the "1's." Thus, whenever 1F5 indicates 1 it must have counted an odd number of pulses in the line and when it indicates an 0 it must have counted an even number of pulses. Thus 1F5 produces the parity bit for the first column.

The counter C5 then steps through the remaining steps and returns to its first step ready to count the value of the sixth bit of information. All five sections of the circuit in FIG. 2 function in identical fashion.

As has been stated earlier, it is desirable to apply a second parity check to a different coordinate of FIG. 1 and to use a different parity law. If FIG. 1 is examined and note taken of the diagonals 1, 7, 13, 19, 25 and 4, 10, 16 and 22, it will be seen that if these numbers are interlaced they give the series 1, 4, 7, 10, 13, 16, 19, 22, 25, etc.

FIG. 3 shows that by re-arranging the block from FIG. 1 into three columns instead of five the columns of the new arrangement in fact represent such interlaced diagonals taken from FIG. 1. The parity law used to determine the parity bits for FIG. 3 is still basically the odd parity law as used in FIG. 1 but the balance of the binary number after the least significant digit has been recorded in that column is carried into the next column and added into the parity word for that column.

In FIG. 3 the number of "1's" in the third column is seen to be five, represented by binary number 101. The least significant digit of this number is inverted and recorded as the parity bit for this column, i.e. 0. The balance of the binary number, i.e. 100 represents four "1's" which are carried into the second column as two times binary 10. This is not a strict binary addition but an adaptation to restrict the carry to the next column only. The second column has four "1's" plus the two carried from the third column, making a total of six "1's." The parity bit thus becomes an inverted 0, i.e. 1, and the carry into the first column is taken as three or three times binary 10, representing the six "1's" in the second column. The first column has two "1's" plus the carry of three making a total of five. The parity bit is therefore 1 inverted to 0, and the carry, which is unused, would be two.

As the second parity law is an extension of the first law, so the circuit in FIG. 4 is based on that of FIG. 2, the difference being the addition of the carry facilities. It will be appreciated that when considering the operation of these circuits it is easier to work from the last step backwards although in practice the counter step in the order indicated in the drawing. This is analogous to writing the block of information in numerical order 1, 2, 3, etc. but adding the fifth column first and then adding the remaining columns from right to left.

Thus in FIG. 4, the counter C3 on its third step will produce the waveform 3W3 which together with a "1" at gate 3G3 will operate the flip-flop 3F3 in exactly the same manner as described in connection with FIG. 2. So also will 3W2 at gate 3G2 affect flip-flop 2F3, though it will pass through an additional gate 3G22. The waveform 3W1 will operate a similar circuit to that operated by 3W2.

Flip flop 2F3 in addition to counting the "1's" applied to 3G2 has to count the carry digits from 3F3. Reference to the description in connection with FIG. 3 will show that such a carry is in effect a 1 for every two "1's" counted by 3F3. Thus each time 3F3 indicates 1, a pulse 3F31 will have to be applied to 2F3, but since 3F3 being a flip-flop, will show a 1 continuously until triggered by the next counting operation on step 3 of C3, means must be introduced to restrict the carry from 3F3 to 2F3 to those occasions when 3F3 changes from 1 to 0. Such occasions are when gate 3G3 conducts, therefore the waveform 3F31 is applied to 2F3 through a 3-condition gate 3G23 which requires the simultaneous appearance of a "1" on the line, the waveform 3W3 and the waveform 3F31. This gate conducts through 3G22 to 2F3, which therefore steps for every "1" counted through 3G2, and every other "1" counted by 3F3 through 3G3. A similar carry arrangement is incorporated into the circuit for the first step of C3.

The third co-ordinate of FIG. 1 for which the third parity check is applied has been taken as another form of diagonal, namely that which is produced by the move such as a so-called "Knight's move" in chess. That is to say that if FIG. 1 is referred to and the first column of the third co-ordinate is taken by moving from the number 1 down one row and along two columns to the number 8 and then down one row and along two columns to the number 15 the series 1, 8, 15, 22, 29 will be produced. Reference to FIG. 5 will show that when the information is rearranged into seven columns such a series forms the first column. The parity law applied to FIG. 5 is the same as that applied to FIG. 3 but the circuit is arranged so that it counts alternate signalling conditions for alternate bits of information in each column. Thus the circuit will count "1's" whenever they appear as bits of information in the first row of any column, "0's" whenever they appear in the second row of any column, "1's" in the third row of any column, "0's" in the fourth row and "1's" in the fifth row. Thus the circuit will count five significant digits in column 7, three significant digits in column 6, four significant digits in column 5, and so on in the present example. The same carry law is used as in the case of FIG. 3, so column 7 will count five significant bits of information, parity bit 1 inverted to 0, carry 2. Column 6 counts three significant digits plus the 2 carried from column 7, making a total of 5, parity bit 1 inverted to 0, carry 2. The fifth column counts 4 significant digits plus the carry of 2 from column 6, making a total of 6, parity bit 0 inverted to 1, carry 3. The fourth column counts 2 plus the carry of 3, making a total of 5, inverted parity 0, carry 2. The third column counts 3 plus the carry of 2 making a total of 5, inverted parity 0, carry 2. The second column counts 2 plus the carry of 2 from the third column making a total of 4, inverted parity 1, carry 2. And finally the first column counts 2 plus the carry of 2 from the second column making a total of 4, inverted parity bit 1, carry unused.

It will be noted that in the cases of FIGS. 1 and 3 that if two adjacent bits of information in any column are transposed, for example, 5 and 10 in FIG. 1 and 6 and 9 in FIG. 3, such errors are compensating and would not be detected by the respective parity checks. However, such an error occurring in FIG. 5 would be detected since although the parity bit in the particular column would be the same the carry to the previous column would be altered.

The circuit shown in FIG. 6 operates in basically the same manner as that shown in FIG. 4 but requires two counting gates for each step of the counter C7, these counting gates operating on alternate steps of the seventh step of C7 and detecting respectively "1's" and "0's" in the line; such gates are those shown at 7G71 and 7G70. Gate 7G71 is arranged to count "1's" on alternate pulse 7W7 and gate 7G70 is arranged to count "0's" in a similar fashion, the alternation between the two gates being controlled by a second counter C2 which steps once for each complete cycle of the counter C7. The two gates 7G71 and 7G70 operate flip-flop 7F7 through a common one-condition gate 7G72. Similarly the gate 7G61 and 7G60 will count alternate "1's" and "0's" on the coincidence of the necessary pulses 7W6 and 2W1 or 2W0. The carry arrangements for this circuit are the same as the carry arrangements described in FIG. 4 in principle, but they have to be duplicated in certain respects for each column because of the counting of alternate "0's" and "1's" by the flip-flop associated with the preceding column. For example, 7F7 may change from 1 to 0 either on the receipt of a "1" or a "0" depending on which row of FIG. 5 is being counted, and therefore the carry arrangement has to work on the receipt of the correct pulse from the line, with which is associated the pulse from the counter C2, and the correct pulse from the counter C7. Thus 7F7 feeds a carry pulse to 6F7 via either gate 7G63 or gate 7G64, depending on whether gate 7G71 or 7G70 is operative. Similar carry arrangements are incorporated into the first five steps of counter C7. Again gates 7G61, 7G63 and 7G64 all pass through gate 7G62 which is a one-condition gate.

In the example described the total number of bits transmitted, i.e. the bits of information plus the parity bits, is 50. Thus in the case of a block of 35 bits of information 15 bits are added for the three parity checks. Whilst this is a high proportion of extra information to be transmitted for such a basic block of information, it will be realised that if the basic block is increased in size to 105 bits, for example, the number of parity bits remains 15. Thus it will be seen that the larger the basic block of information within reason the more efficient is the system of parity checks described from the point of view of decrease in the effective speed of transmission and increase in the amount of circuitry required to operate such checks.

Although three simple parity laws have been described, the invention is not limited to the use of these particular laws but to a combination of any suitable parity laws which will provide a similar high efficiency of error detection coupled with a small loss in effective transmission speed and a small increase in circuitry.

It is to be understood that the foregoing description of specific examples of this invention is not to be considered as a limitation on its scope.

What I claim is:

1. A telegraph signal transmission system using only two signalling conditions, mark and space, comprising: a transmitting station; a receiving station; means at the transmitting station for deriving from a block of signal elements a plurality of groups of check elements, each of which groups is indicative of a different particular relation between all of the marks and spaces contained in the said block of signal elements, the check elements within each group being derived individually from selected different groups of the signal elements in said block; means at said transmitting station for transmitting the said block of signal elements together with the said plurality of groups of check elements; means at the receiving station for deriving from the said transmitted block of signal elements a second plurality of groups of check elements corresponding to the groups of transmitted check elements according to the same parity and selective grouping rules as used at the transmitting station; means at the receiving station for automatically comparing the said second check elements with the corresponding transmitted check elements; and means coupled to said comparing means at said receiving station for indicating an error in the transmitted signal elements, upon detection of a discrepancy between the said transmitted and second check elements.

2. A telegraph signal transmission system using only two signal conditions, mark and space, comprising: a transmitting station; a receiving station; first means at the transmitting station for deriving from a block of signal elements a first plurality of check elements indicative of a first parity relation between all of the marks and spaces contained in said block of signal elements; second means at said transmitting station for deriving from the block of signal elements a second plurality of check elements indicative of a second parity relation between all of the marks and spaces contained in said block of signal elements, said second parity relation involving a difference selective grouping of the signal elements in said block, relative to the grouping required for said first parity relation, said second parity relation further involving a different handling of carry signals, resulting from the parity addition of said selectively grouped signal elements, from the handling accorded carry signals by said first means; means at said transmitting means for transmitting said block of signal elements together with first and second pluralities of check elements; first means at said receiving station corresponding to said first means at said transmitting station for deriving a first plurality of new check elements corresponding to said first plurality of transmitted check elements; second means at said receiving station corresponding to the said second means at said transmitting station for deriving from said block of signal elements a second plurality of new check elements corresponding to said second plurality of transmitted check elements; means at said receiving station for automatically comparing the said first and second pluralities of new check elements to the said first and second pluralities of transmitted check elements; and means at said receiving station for indicating an error upon detection of a discrepancy by said comparing means.

References Cited in the file of this patent

UNITED STATES PATENTS 2,974,865 Reumerman ------------ Mar. 14, 1961

OTHER REFERENCES

Hagelbarger: "Recurrent Codes: Easily Mechanized, Burst Correcting, Binary Codes," Bell System Technical Journal, vol. 38, No. 4, July 1959, pp. 969–985.

Green and San Soucie: "An Error Correcting Encoder and Decoder of High Efficiency," Proceedings of the I.R.E., October 1958, pp. 1741–1744.

Fire: "A Class of Multiple-Error-Correcting Binary Codes for Non-Independent Errors," Technical Report No. 55, Stanford Electronic Laboratories, April 24, 1959.